United States Patent [19]

Sammells

[11] 4,226,922
[45] Oct. 7, 1980

[54] SODIUM SULFUR ELECTROCHEMICAL CELL OR BATTERY

[75] Inventor: Anthony F. Sammells, Naperville, Ill.

[73] Assignee: Institute of Gas Technology, Chicago, Ill.

[21] Appl. No.: 65,081

[22] Filed: Aug. 9, 1979

[51] Int. Cl.² ............................................. H01M 10/39
[52] U.S. Cl. ................................................... 429/104
[58] Field of Search ........................................ 429/104

[56] References Cited

U.S. PATENT DOCUMENTS

| | | | |
|---|---|---|---|
| 4,024,320 | 5/1977 | Gibson et al. | 429/104 |
| 4,127,705 | 11/1978 | Fisher et al. | 429/104 |
| 4,160,069 | 7/1979 | Johnson et al. | 429/104 |
| 4,164,610 | 8/1979 | Beall et al. | 429/104 |
| 4,173,686 | 11/1979 | Brennan | 429/104 |

*Primary Examiner*—Donald L. Walton
*Attorney, Agent, or Firm*—Thomas W. Speckman

[57] ABSTRACT

A stable, long life sodium/sulfur electrochemical cell or battery wherein the cathodic current collector has a boronized surface in contact with the cathodic reactant and an additional boron source in physical proximity to the boronized current collector surface. In one embodiment, the cathodic current collector is the can or electrode container thereby providing a stable, long life cell casing protected from corrosion effects.

11 Claims, No Drawings

SODIUM SULFUR ELECTROCHEMICAL CELL OR BATTERY

BACKGROUND OF THE INVENTION

1. Field of the Invention

This invention relates to stable, long life sodium/sulfur electrochemical cells or batteries of the type having at least one anode chamber with anodic reactant and at least one cathode chamber with cathodic reactant, the anodic reactant and cathodic reactant being separated from each other by a sodium ion conducting solid electrolyte. More particularly, this invention relates to providing a stable, long lived cathodic current collector having a boronized surface in contact with the cathodic reactant and an additional boron source in physical proximity to the boronized current collector surface. In one embodiment, the cathodic current collector is the can, or electrode container, and therefore this invention provides stable, long life cell casings, particularly a casing which is protected from corrosion effects at the anodic potentials during charging.

2. Description of the Prior Art

Sodium/sulfur electrochemical cells or batteries of the type having at least one anode chamber with anodic reactant and at least one cathode chamber with cathodic reactant and separated from each other by a sodium ion conducting solid electrolyte and having a current collector in contact with the cathodic reactant are known to the art. Instability of such electrochemical cells or batteries due to corrosion of the cathode current collector, particularly when it also serves as the cell casing, has been recognized in the art. Such corrosion is deleterious both from the standpoint of physical change of the cell container and reaction of the sulfur in the formation of corrosion products thereby reducing the cell capacity. Various attempts to solve these problems have included coatings, liners and electrical screening. U.S. Pat. No. 4,129,690 recognizes that under the electrochemical conditions prevailing in the sulfur electrode area, even stainless steel is subject to corrosion and proposes to overcome this problem by providing a current collector of electrically conductive impermeable material chemically and electrochemically inert to the cathodic reactant, such as carbon or graphite. The structure may either be made of or coated with carbon or graphite. Another proposal for achievement of stability of the sulfur electrode container is suggested by U.S. Pat. No. 4,131,226 wherein a rigid outer container of material such as mild steel is provided with an inner liner or clad of a more corrosion resistant material such as stainless steel, molybdenum or nickel-chromium. Another proposal to reduce corrosion of the cathodic cell wall in a sodium/sulfur cell or battery is provision of a screening electrode to electrically screen the cell wall as suggested by U.S. Pat. No. 4,029,857. Still another proposal for reduction of corrosion of the cell casing is provision of a hermetic mechanical seal of glass and ceramic as suggested by U.S. Pat. No. 3,946,751. None of the prior art known to me relating to cell casings and cathodic current collectors has suggested a boronized surface in contact with the cathodic reactant.

Utilization of boron in sodium/sulfur electrochemical cells or batteries has been suggested for specific applications. For example, U.S. Pat. No. 4,091,151 refers to boron oxide modified beta-type alumina for use as the cation-permeable barrier between the anodic reactant and cathodic reactant. U.S. Pat. No. 4,127,705 teaches the addition of selenium, boron or iodine to the cathodic reactant to obtain lowering of the viscosity of the sulfur thereby increasing rechargeability. U.S. Pat. No. 4,002,806 recognizes the problems of decreased cycle life and deteriorating charge/discharge capacity due to corrosion of metal cell parts and suggests use of protective liners and noncorroding, nonconductive material such as glass or ceramic while providing electric contact between the electrode and the external circuit by current lead rather than through the container body. U.S. Pat. No. 4,002,806 also suggests a boron oxide modified beta-type alumina ceramic material as a reaction zone separator. According to the U.S. Pat. No. 4,002,806, increase of the charge/discharge capacity of the sodium/sulfur battery or cell may be increased by addition to the cathodic reactant of metals from Groups I, II and III of the Peroidic Table of Elements, Transition Series Metals and antimony, lead, tin and bismuth and/or alloys, salts, oxides, phosphides, arsenides, antimonides, carbides and nitrides of the metals and/or mixtures thereof. To my knowledge the prior art has not suggested use of a boronized surface in contact with the cathodic reactant of a sodium/sulfur cell or battery and the utilization of an additional boron source in physical proximity to the boronized surface to obtain long-term stability and freedom from corrosion.

SUMMARY OF THE INVENTION

Sodium/sulfur electrochemical cells or batteries are known to the art to have various physical configurations as pointed out by the above cited prior art patents. This invention is applicable to any configuration of such cells or batteries having a cathodic current collector providing electrical contact between a cathodic reactant and an external circuit. In a preferred embodiment of this invention the cathodic current collector is a current collector can or cell container. In another embodiment of this invention the cathodic current collector is a rod in contact with the cathodic reactant. The term "cathodic current collector" as used herein is intended to mean any metallic structure in contact with the cathodic reactant and providing electrical conductance between the cathodic reactant and the external circuit.

The cells of the type to which this invention relates comprise at least one anode chamber with a molten sodium anode reactant and an anodic current collector in contact with the anode reactant and electrical contact with an external circuit, at least one cathode chamber with molten sulfur and/or sodium polysulfide as a cathodic reactant which is electrochemically reversibly reactive with the anodic sodium reactant and a cathodic current collector in contact with the cathodic reactant and in electrical contact with the external circuit, and a solid electrolyte cation-permeable barrier between the anodic and cathodic reactants. During discharge of the cell, molten sodium atoms give up an electron to the external circuit with the resulting cation passing through the solid electrolyte barrier to unite with polysulfide ions. The polysulfide ions are formed by charge transfer on the cathodic current collector by reaction of the cathodic sulfur reactant with electrons conducted from the external circuit. During charging of the cell a negative potential larger than the open circuit cell voltage is applied to the anode and the opposite process occurs, that is, electrons are removed from the sodium polysulfide by charge transfer at the surface of the cathodic current collector and conducted through the external circuit, the sodium cation conducted through the solid electrolyte to the anode where it accepts an electron from the external circuit.

Suitable methods for providing a boronized surface to a metallic substrate, particularly a low carbon ferrous substrate, are known to the art. The methods for preparing boride coatings, called boronizing or boriding, may generally be divided into four categories: gas boronizing by flowing a chemically active boron-containing gas over a substrate; immersion in a boron-containing molten-salt bath; electrolysis in a boron-containing molten-salt bath; and pack boronization, immersing the substrate into a boron-containing material, a filler and an activating material capable of producing a volatile, boron-containing compound. Canadian Pat. No. 1,001,532 teaches suitable methods for boriding. Thick iron boride coatings can be easily prepared and thicknesses of several hundred micrometers are common. Low carbon steels are the most easily boronized ferrous metals and show a characteristic dentate structure having depths in the order of 0.05 to 0.20 mm using packed boronization techniques. Low carbon steels such as AISI 1008 or 1018 steels are suitable. Alloying retards boronization and creates a smooth boundary between the coating and the ferrous substrate, unlike the characteristic dendate structure observed with the boride coatings on low carbon steels.

While the boride on low carbon ferrous materials show excellent corrosion resistance in service as current collectors for sodium sulfur batteries, defects or pinholes in the boride coating may permit local corrosion at the sites of such corrosion defects and the surfaces may become more susceptible to corrosion due to slow diffusion of the boride from the current collector surface into the base material at elevated cell operating temperatures. I have found that an additional boron source in physical proximity to the boronized current collector surface will provide boride replenishment for the current collector surface to compensate for the boride diffusion into the base metal and pinhole imperfections present in the original boronized surface. The additional boron source is not sufficient to provide the stability desired without the cathodic current collector surface being boronized initially. The additional boron source may comprise boron added to the cathodic reactant, such as about 0.001 to about 10 weight percent, based upon the total cathodic reactant, of a boron-containing compound such as $B_2S_3$. Another advantageous way of providing an additional boron source in physical proximity to the boronized current collector surface is boron carbide in a porous electrode structure in the cathodic reactant adjacent to the boronized current collector surface. For this use $B_4C$ may be used in place of the usual graphite felt in the cathode chamber volume.

The boronized cathodic current collector surface, together with an additional boron source in physical proximity to the boronized cathodic current collector surface in a sodium sulfur electrochemical cell or battery of any desired configuration provides long term cell stability with freedom from corrosion. The boronized surface itself improves electronic conductivity in addition to the improvement due to freedom from corrosion. When the cathodic current collector is the can, or electrode container, it can be fabricated from low carbon steel provided with a boronized surface in the areas in contact with the cathodic reactant thereby providing long term stability to the cell container at economical costs.

Preferred embodiments are shown in the following examples set forth in greater detail and are meant to be exemplary only and in no way to limit the invention.

EXAMPLE I

A low carbon exterior cell casing can is fabricated from 1008 steel and the interior surface which will be contacted by cathodic reactant boronized by pack boronization. The steel surface to be boronized is washed with 5 molar HCl, dried with methanol and contacted with a pack mixture of 20 mole percent $B_4C$, 75 mole percent graphite powder and 5 mole percent $KBF_4$ (activator). The substrate and pack mixture is heated and maintained at about 960° C. for 4 hours in an air atmosphere. The surface is coated with FeB and $Fe_2B$ having a characteristic dentate appearance upon microscopic examination. The coating thickness is about 0.075 mm for complete coverage and about 0.15 mm for maximum depth from the surface to the substrate.

A sodium/sulfur cell having a configuration of the cells taught by U.S. Pat. No. 3,946,751 is fabricated using the above produced boronized cell casing. An additional boron source of about 3 weight percent $B_2S_2$ is added to the polysulfide melt cathodic reactant.

EXAMPLE II

A sodium/sulfur cell as described in Example I is fabricated with a boronized inner surface low carbon steel cell container. The additional boron source, instead of a boron compound added to the sulfur melt as in Example I, is provided by a $B_4C$ porous structure in the cathode chamber in contact with the boronized surface of the cell container.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a sodium/sulfur electrochemical cell or battery having at least one anode chamber with anodic reactant and at least one cathode chamber with cathodic reactant and separated from each other by a sodium ion conducting solid electrolyte and having a cathodic current collector in contact with the cathodic reactant, the improvement comprising said cathodic current collector comprising a boronized surface in contact with said cathodic reactant and an additional boron source in physical proximity to said boronized surface.

2. The sodium/sulfur electrochemical cell or battery of claim 1 wherein said cathodic current collector comprises a low carbon steel can having a boronized surface in contact with said cathodic reactant 3. The sodium/sulfur electrochemical cell or battery of claim 2 wherein said boronized surface is about 0.050 to about 0.200 millimeters thick.

4. The sodium/sulfur electrochemical cell or battery of claim 2 wherein said additional boron source comprises boron in said cathodic reactant.

5. The sodium/sulfur electrochemical cell or battery of claim 4 wherein said boron comprises about 0.001 to about 10 weight percent of said cathodic reactant.

6. The sodium/sulfur electrochemical cell or battery of claim 2 wherein said additional boron source comprises boron carbide in a porous electrode in said cathodic reactant.

7. The sodium/sulfur electrochemical cell or battery of claim 1 wherein said cathodic current collector comprises a low carbon steel rod having a boronized surface in contact with said cathodic reactant.

8. The sodium/sulfur electrochemical cell or battery of claim 7 wherein said boronized surface is about 0.050 to about 0.200 millimeters thick.

9. The sodium/sulfur electrochemical cell or battery of claim 7 wherein said additional boron source comprises boron in said cathodic reactant.

10. The sodium/sulfur electrochemical cell or battery of claim 9 wherein said boron comprises about 0.001 to about 10 weight percent of said cathodic reactant.

11. The sodium/sulfur electrochemical cell or battery of claim 7 wherein said additional boron source comprises boron carbide in a porous electrode in said cathodic reactant.

* * * * *